(12) United States Patent
Beltran et al.

(10) Patent No.: US 11,524,233 B2
(45) Date of Patent: Dec. 13, 2022

(54) PASSING CONTROL OF CLOUD GAMEPLAY

(71) Applicant: Sony Interactive Entertainment LLC, San Mateo, CA (US)

(72) Inventors: Justin Beltran, San Mateo, CA (US); Dylan Butler, San Mateo, CA (US); Alexander Jarzebinski, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 29 days.

(21) Appl. No.: 16/730,898

(22) Filed: Dec. 30, 2019

(65) Prior Publication Data

US 2020/0129858 A1    Apr. 30, 2020

Related U.S. Application Data

(63) Continuation of application No. 15/993,603, filed on May 31, 2018, now Pat. No. 10,898,802.

(51) Int. Cl.
*A63F 13/355* (2014.01)
*A63F 13/42* (2014.01)
*A63F 13/847* (2014.01)

(52) U.S. Cl.
CPC ............ *A63F 13/42* (2014.09); *A63F 13/355* (2014.09); *A63F 13/847* (2014.09)

(58) Field of Classification Search
CPC .................................................... A63F 13/847
See application file for complete search history.

(56) References Cited

U.S. PATENT DOCUMENTS

| | | | |
|---|---|---|---|
| 8,435,121 B1 * | 5/2013 | Fisher .................. | A63F 13/355 |
| | | | 463/42 |
| 10,737,180 B1 * | 8/2020 | Noland .................. | A63F 13/35 |
| 2004/0266530 A1 * | 12/2004 | Bishop .................. | A63F 13/12 |
| | | | 463/42 |
| 2010/0304860 A1 | 12/2010 | Gault et al. | |

(Continued)

FOREIGN PATENT DOCUMENTS

JP              2014150848 A       8/2014

OTHER PUBLICATIONS

A. Suhardi and J. Loviscach: "How to Steer Characters in Group Games," Nov. 30, 2008, Int'l. Conf. on Computer Analysis of Images and Patterns. CAIP 2017: Computer Analysis of Images and Patterns; [Lecture notes in Computer Science; Lect. notes computer], Springer, Berlin, Heidelberg, pp. 48-58, XP019125043, ISBN: 978-3-642-17318-9.

(Continued)

*Primary Examiner* — Jay Trent Liddle
(74) *Attorney, Agent, or Firm* — Penilia IP, APC

(57) ABSTRACT

A method includes: executing a video game by a cloud gaming machine; streaming, by a video server over a network, video generated from the executing video game to a plurality of client devices; enabling gameplay of the video game that includes control of a virtual object of the video game by one of the client devices, and passing the control of the virtual object to each of the client devices in turn, wherein passing the control is responsive to detecting a predefined condition during the gameplay of the video game.

21 Claims, 9 Drawing Sheets

(56) References Cited

U.S. PATENT DOCUMENTS

| | | | |
|---|---|---|---|
| 2011/0223996 A1* | 9/2011 | Yerli | A63F 13/27 |
| | | | 463/36 |
| 2012/0302352 A1* | 11/2012 | Ajami | A63F 13/69 |
| | | | 463/42 |
| 2013/0059654 A1* | 3/2013 | Oh | A63F 13/77 |
| | | | 463/29 |
| 2013/0084985 A1* | 4/2013 | Green | A63F 9/24 |
| | | | 463/40 |
| 2013/0296059 A1* | 11/2013 | Sestak | G07F 17/3272 |
| | | | 463/42 |
| 2014/0179428 A1* | 6/2014 | Miura | A63F 9/24 |
| | | | 463/31 |
| 2014/0274359 A1* | 9/2014 | Helava | A63F 13/69 |
| | | | 463/29 |
| 2016/0101355 A1 | 4/2016 | Pereira et al. | |
| 2016/0158653 A1* | 6/2016 | Fear | A63F 13/355 |
| | | | 463/29 |
| 2016/0375363 A1 | 12/2016 | Connor et al. | |
| 2017/0072322 A1* | 3/2017 | Navok | A63F 13/355 |
| 2017/0225082 A1* | 8/2017 | Suwa | H04N 21/2187 |
| 2017/0354878 A1 | 12/2017 | Posin | |

OTHER PUBLICATIONS

Invitation to Pay Additional Fees (Form PCT/ISA/206), issued in corresponding International Patent Application No. PCT/US2019/031398, dated Aug. 22, 2019 (10 total pages).

International Search Report and Written Opinion of the International Searching Authority from counterpart International Application No. PCT/US2019/031398, (Forms PCT/ISA/220-210-237) dated Oct. 18, 2019 (18 total pages).

* cited by examiner

PASSING CONTROL OF CLOUD GAMEPLAY

BACKGROUND

1. Field of the Disclosure

The present disclosure relates to bifurcation of shared controls and passing controls in an interactive application such as a video game.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. The user wearing an HMD is afforded freedom of movement in all directions, and accordingly can be provided a view of the virtual environment in all directions via the HMD.

It is in this context that implementations of the disclosure arise.

SUMMARY

Implementations of the present disclosure include devices, methods and systems relating to bifurcation of shared controls and passing controls in an interactive application such as a video game.

In some implementations, a method is provided, including the following method operations: executing a video game by a cloud gaming computer; streaming video generated from the executing video game over a network to a primary client device; streaming the video over the network from the primary client device to one or more secondary client devices; receiving, over the network by an input aggregation server, input data from the secondary client devices; sending, over the network by the input aggregation server, the input data from the secondary client devices to the primary client device, the primary client device being configured to generate combined input data by combining the input data from the secondary client devices with input data generated at the primary client device; receiving, over the network by the cloud gaming computer, the combined input data; applying, by the cloud gaming computer, the combined input data to drive the execution of the video game.

In some implementations, the combined input data defines a single input stream for control of a single player's activity in the video game.

In some implementations, the combined input data defines commands that are mapped to a single controller device that is operably connected to the primary client device.

In some implementations, the commands defined by the combined input data include a first command mapped to a first input device of the single controller device, and a second command mapped to a second input device of the single controller device, wherein the first command is initiated from activation of the first input device at the single controller device, and wherein the second command is initiated from activation of an input device at a secondary controller device that is operably connected to one of the secondary client devices.

In some implementations, the second command being initiated from activation of the input device at the secondary controller device defines a remote virtual triggering of the second input device of the single controller device by the secondary client device through the input aggregation server.

In some implementations, streaming the video from the primary client device to the one or more secondary client devices occurs over a peer-to-peer network that includes the primary client device and the one or more secondary client devices.

In some implementations, the video generated from the executing video game defines a view of a virtual environment.

In some implementations, a method is provided, including the following method operations: executing a video game by a cloud gaming computer; streaming, by a video server over a network, video generated from the executing video game to a primary client device and to one or more secondary client devices; receiving, over the network by an input aggregation server, input data from the primary client device and input data from the secondary client devices; generating, by the input aggregation server, combined input data using the input data from the primary client device and the input data from the secondary client devices; sending, by the input aggregation server, the combined input data to the cloud gaming computer; applying, by the cloud gaming computer, the combined input data to drive the execution of the video game.

In some implementations, the combined input data defines a single input stream for control of a single player's activity in the video game.

In some implementations, the combined input data defines commands that are mapped to a single controller device that is operably connected to the primary client device.

In some implementations, the commands defined by the combined input data include a first command mapped to a first input device of the single controller device, and a second command mapped to a second input device of the single controller device, wherein the first command is initiated from activation of the first input device at the single controller device, and wherein the second command is initiated from activation of an input device at a secondary controller device that is operably connected to one of the secondary client devices.

In some implementations, the second command being initiated from activation of the input device at the secondary controller device defines a remote virtual triggering of the second input device of the single controller device by the secondary client device through the input aggregation server.

In some implementations, the video generated from the executing video game defines a view of a virtual environment.

In some implementations, a system is provided, including the following: a cloud gaming computer configured to execute a video game, wherein video generated from the executing video game is streamed over a network to a primary client device, the primary client device configured to stream the video over the network from the primary client device to one or more secondary client devices; an input aggregation server configured to receive, over the network, input data from the secondary client devices, the input aggregation server further configured to send, over the network, the input data from the secondary client devices to the primary client device, the primary client device being configured to generate combined input data by combining the input data from the secondary client devices with input data generated at the primary client device; the cloud gaming computer configured to receive, over the network from the primary client device, the combined input data, the cloud gaming computer further configured to apply the combined input data to drive the execution of the video game.

In some implementations, the combined input data defines a single input stream for control of a single player's activity in the video game.

In some implementations, the combined input data defines commands that are mapped to a single controller device that is operably connected to the primary client device.

In some implementations, the commands defined by the combined input data include a first command mapped to a first input device of the single controller device, and a second command mapped to a second input device of the single controller device, wherein the first command is initiated from activation of the first input device at the single controller device, and wherein the second command is initiated from activation of an input device at a secondary controller device that is operably connected to one of the secondary client devices.

In some implementations, the second command being initiated from activation of the input device at the secondary controller device defines a remote virtual triggering of the second input device of the single controller device by the secondary client device through the input aggregation server.

In some implementations, streaming the video from the primary client device to the one or more secondary client devices occurs over a peer-to-peer network that includes the primary client device and the one or more secondary client devices.

In some implementations, the video generated from the executing video game defines a view of a virtual environment.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide devices, methods, and systems relating to bifurcation of shared controls and passing controls in an interactive application such as a video game. It will be obvious, however, to one skilled in the art that the present disclosure may be practiced without some or all of the specific details presently described. In other instances, well known process operations have not been described in detail in order not to unnecessarily obscure the present disclosure.

Broadly speaking, implementations of the present disclosure provide various methods and systems that promote collaborative gaming through shared control of video game entities and characters. For example, in some implementations, control of a single player's session is bifurcated amongst two or more remote users. By way of example, one user might control a given action for a character, while another user controls a different action for that same character. It will be appreciated that these actions may be mapped to various input devices of a single primary controller device. And thus, control of the input devices is split out amongst the users. As the users are remote from each other, their inputs can be aggregated and then applied as a single input stream for the single player's session.

In another implementation, control of a character or other video game entity can be passed from one user to another user. In some implementations there are many users and control is passed in a round-robin fashion. In this way, each member of a team of users is given a turn to control the character or video game entity.

Extending the concepts, in another implementation, a team of users can control a limited number of characters in a video game. That is, there is a certain number of characters that are available to control in a video game, and a larger number of users on the team. At any given time, different users on the team can be assigned to control different ones of the characters. For example, a team captain may substitute one user for another with respect to a given character in the video game.

For ease of description, reference will be made throughout the present disclosure to control of a given character in a video game. However, it will be appreciated by those skilled in the art that the presently described concepts apply not only to characters in a video game, but to any entity that is controllable by a given user in a video game. Accordingly, the term character can be used interchangeably with any other entity of the video game that is controllable by a given user. And more specifically, the character or entity is one that is traditionally controlled by a single user.

Figure 1:
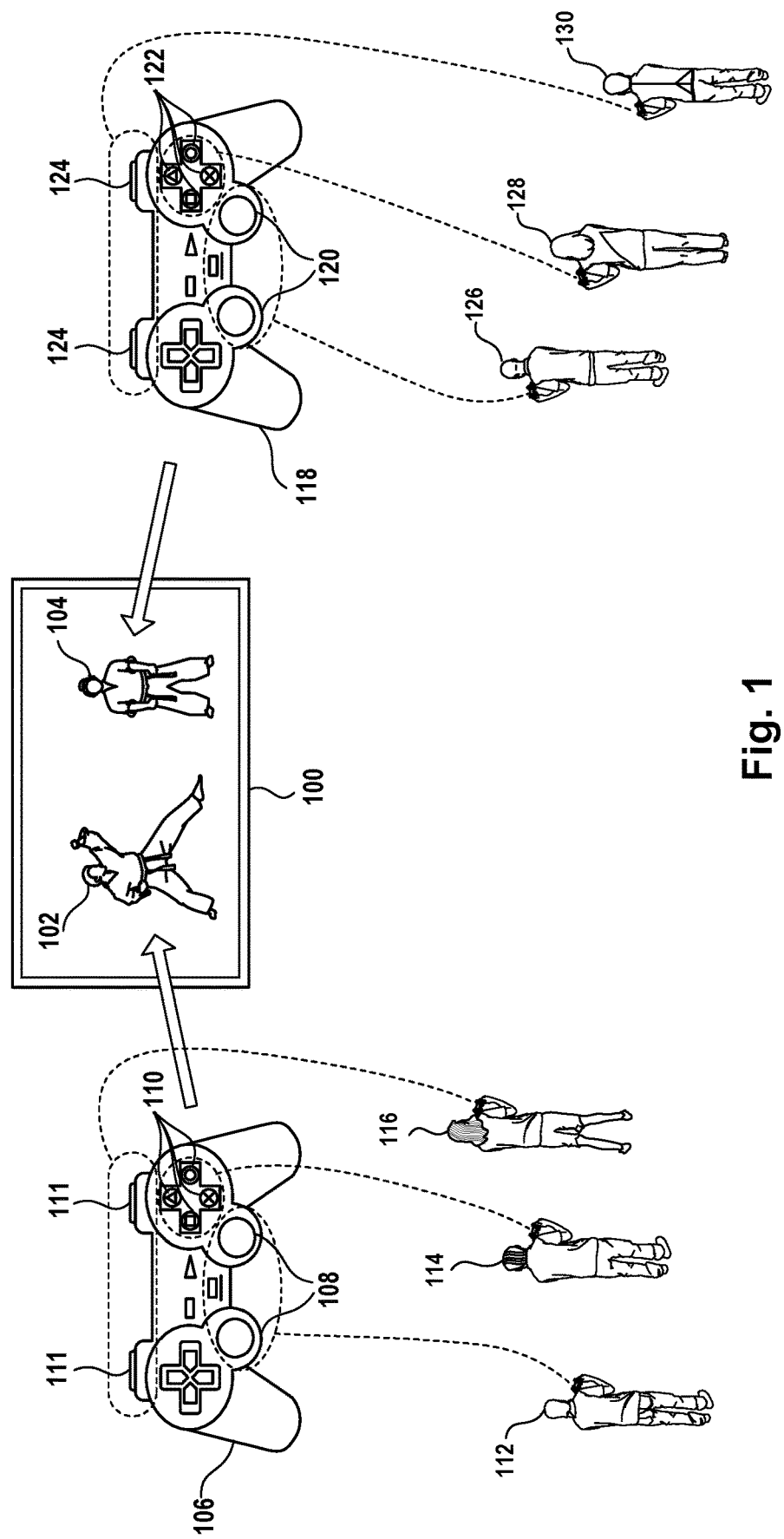
FIG. 1 conceptually illustrates bifurcation of control of a single player's session amongst several users, in accordance with implementations of the disclosure.

FIG. 1 conceptually illustrates bifurcation of control of a single player's session amongst several users, in accordance with implementations of the disclosure. A video game is executed and video that is generated by the execution of the video game is shown at reference 100. It will be appreciated that in some implementations the video game is executed by a cloud gaming machine, whereas in other implementations the video game is executed by a local client machine, such as a gaming console or personal computer, or other computing device. The execution of the video game to find a session of the video game for a given user. By way of example with reference to the illustrated implementation, the session of the video game can be defined for gameplay by the user 112. For example, the user 112 may initiate the execution of the video game, and so the session that is instantiated is associated to the user 112.

In a regular gameplay scenario, the user 112 may operate a controller device 106 to provide input to the executing video game to control, by way of example, a character 102 (or other video game entity) in a virtual environment defined by the executing video game. In the illustrated implementation, the controller device 106 is shown to include various input devices such as joysticks 108, buttons 110, and triggers 111. In the normal single user mode of gameplay, all of the inputs from the input devices of the singular controller device 106 are controlled by the user 112.

However, in accordance with implementations of the disclosure, a multi user mode of gameplay is provided whereby the inputs can be bifurcated and assigned to other users for control. That is, other users are enabled to virtually control portions of the controller device 106 in a remote fashion. By way of example without limitation, with reference to the illustrated implementation, additional users 114 and 116 are provided with the ability to control portions of the controller device 106. For example, the primary user 112 may control the joysticks 108, whereas the secondary user 114 controls buttons 110, and another secondary user 116 controls the triggers 111. It will be appreciated that the joysticks 108, the buttons 110, and the triggers 111 may each correspond to different functions or actions in the video game. For example, the joysticks 108 may be mapped to control movement of the character 102 (e.g. running, walking, etc.), and the buttons 110 may be mapped to control actions of the character 102 such as jumping or punching, etc., and the triggers 111 may control a shooting action (e.g. firing a weapon) by the character 102. In this way, each of the users 112, 114, and 116 is tasked with controlling a specific subset of activities for the character 102 in the video game. In a single user mode, all of these activities would be controlled by the primary user 112, however in the multi-user mode presently described, multiple users can engage in collaborative gameplay by sharing control of the character 102 in this manner.

The users 112, 114, and 116 are situated remotely from each other, and therefore it will be appreciated that the users 114 and 116 do not physically control the input devices of the primary user's controller device 106. Rather each of the users 114 and 116 is enabled through systems of the present disclosure to view the video 100 of the executing video game in their own local environment, and provide input that is mapped to the same command functionality as that of the input devices of the controller device 106 to which they have been assigned. In this manner, the user 114 is able to remotely and virtually control the functions that are mapped to the buttons 110, whereas the user 116 is able to remotely and virtually control the functions that are mapped to the triggers 111.

Broadly speaking, each of the secondary users 114 and 116 may operate their own respective controller devices, and inputs from each of the users 114 and 116 can be transmitted and aggregated with inputs from the user 112 operating the controller device 106, to provide a combined input stream that is transmitted to the executing video game as if the combined input stream originated from the controller device 106 only. Hence, while the session of the video game may be defined for a single player, namely the primary user 112, additional users 114 and 116 are able to join in the game play and afforded control of a portion of the controllable actions of the character 102 in the video game.

In some implementations, the primary user 112 can invite the secondary users 114 and 116 to join their session. Further, the primary user 112 may grant permission to the users 114 and 116 and assign them to control the portions of the game play as described. In some implementations, the primary user 112 is enabled to decide how to split up the controls, that is, determine which specific commands will be allocated to which specific secondary users.

In some implementations, the secondary user's 114 or 116 may first spectate the game play of the video game by the primary user 112, before requesting or being invited to share the controller. By way of example, the users 112, 114, and 116 may be friends on a social network, and be able to see when each other is engaged in gameplay or online. Users may receive notifications about each other's gameplay, and so gain access to spectate and possibly engage in bifurcated control as presently described.

The presently described concepts for bifurcated control of a single player's gameplay can be extended to a multiplayer game session scenario. For example, with continued reference to the implementation of FIG. 1, there can be another primary user 126 that controls a character 104 in the video game. As shown, the user 126 operates a controller device 118 having various input devices that are configured to provide input to the video game in order to control the actions of the character 104. However, similar to concepts described above, in some implementations, control of the character 104 can be bifurcated amongst several users. Thus by way of example, additional users 128 and 130 can be provided with the video 100 of the executing video game, and also a portion of control of the commands that are mapped to input devices of the primary controller device 118. For example, while the primary user 126 controls the joysticks 120 of the controller device 118, the user 128 can control the buttons 122, and the user 130 can control the triggers 124. As noted above, the secondary users 128 and 130 do not physically control the buttons and triggers, as they are remotely situated. However, they provide input that is mapped to the commands that are assigned to the buttons and the triggers, so that when combined with the input from the primary user 126 operating the joysticks 120, the combined input is presented as a single input stream to the executing video game as if originating from the controller device 118 to control the actions of the character 104.

It will be appreciated that the presently described bifurcated control scheme can enable more users to be engaged in gameplay of a given video game than would normally be the case for a single player game setup. Furthermore, this can provide for new dynamics to the gameplay. For example, the users that share the control of a given character or entity in the video game can enjoy the challenge of coordinating their activities in order to fulfill the goals of the video game. Furthermore, a group of users that collaboratively controls a single character or entity can form a team, and compete against other teams that likewise collaboratively control another character or entity in the video game.

In further implementations, there can be templates for a given game that define how buttons or other input devices and commands are allocated. In some implementations, users may vote or rate or indicate approval of templates (e.g. like, thumbs up, etc.). In some implementations, such templates and/or the division of controls can change throughout a given game. For example, in one part of the game it may make sense to split the controls one way, whereas in another part of the game it may make sense to split the controls another way. Furthermore, in some implementations, the shifting of the division of controls can be at a set point in the game or can be dynamically in response to some condition. It will be appreciated that this can provide further complexity to the game play.

Figure 2:
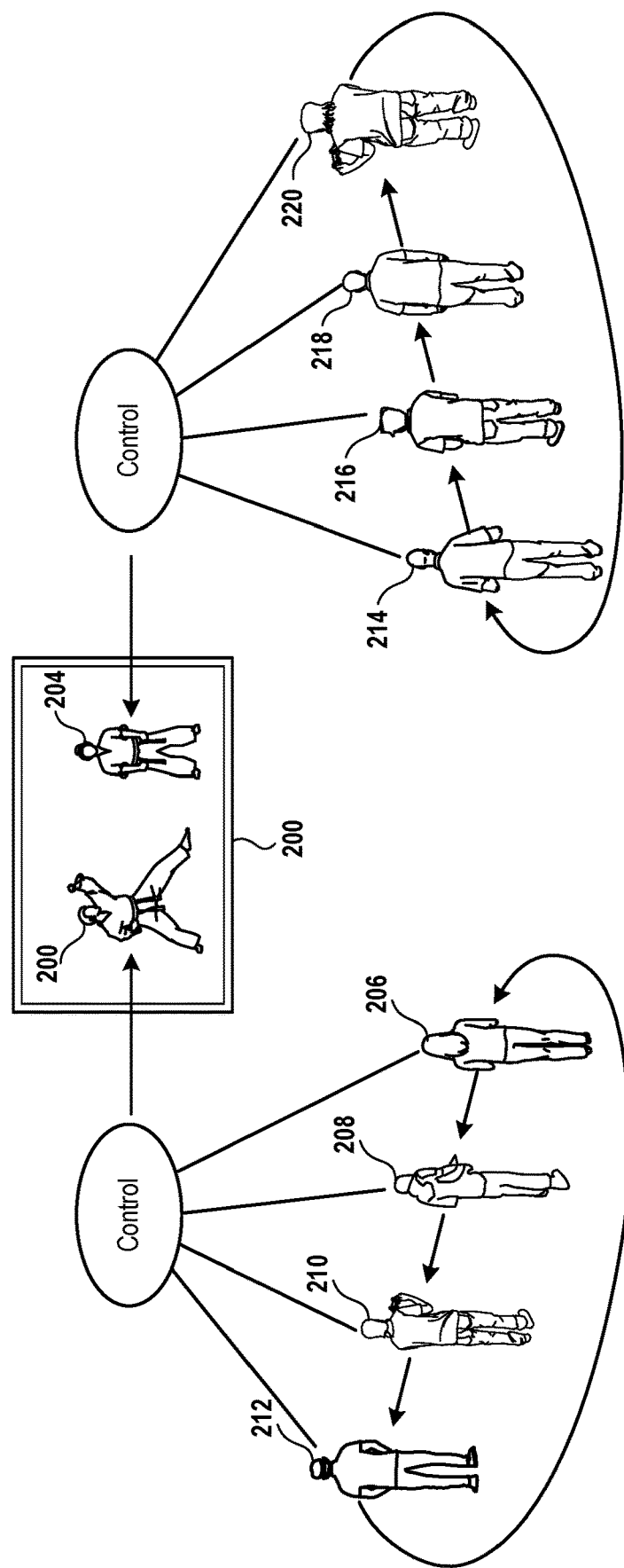
FIG. 2 conceptually illustrates passing of control of a video game entity amongst a group of users, in accordance with implementations of the disclosure.

FIG. 2 conceptually illustrates passing of control of a video game entity amongst a group of users, in accordance with implementations of the disclosure. In the illustrated implementation, a number of users are engaged in gameplay of a video game, conceptually shown at reference 200. A group of users 206, 208, 210, and 212 are assigned to control a virtual character 202. In accordance with some implementations, control of the virtual character 202 is passed from one user to another in a round-robin fashion. For example, during a first period of time the virtual character 202 is controlled by the user 206; during a successive second period of time, the virtual character 202 is controlled by the user 208; and, during successive third and fourth periods of time, the virtual character 202 is controlled by the user 210 and the user 212, respectively. At the completion of the cycle, control is returned to the first user 208, and cycled through the users again in a round-robin fashion.

In some implementations, each user is given an equivalent amount of time to control the character. For example, each of the users 206, 208, 210, and 212 may be given two minutes of time to control the virtual character 202, at the expiration of which control is passed to the next user.

In other implementations, the amount of time that a given user is allotted to control the character can vary based on one or more factors. For example, in some implementations, higher amounts or rates of achievement are rewarded with increased time of control. For example, if a user scores points or otherwise achieves objectives at a predefined rate or within a given amount of time, then they may be able to continue controlling the character for an additional amount of time; otherwise control is passed to the next user. In some implementations, the amount of time allotted to a given user to control the character is determined based on a skill level of the user. For example, the amount of time allotted may be inversely correlated to the skill level of the user, such that users with lower skill levels are given increased amounts of time, whereas users with higher skill levels are given lower amounts time to control the character.

In some implementations, a user controls the character until he or she decides to relinquish control to the next user, for example by pressing a button or providing input indicating as such. In another implementation, a current user controls the character until the next user interrupts the current user to take over control of the character. In such an implementation, the current user may be given a minimum amount of time before the next user is able to interrupt and take over control. In some implementations, some or all of the users that are not currently controlling the character may collectively determine when control is passed to the next user. For example, control may be passed when some or all (e.g. a threshold amount/percentage) of the non-controlling users indicate that control should be passed, for example by pressing a button or providing another input.

It will be appreciated that in a multiplayer game, there can be multiple characters that collaborate with each other or compete against one another. With reference to the illustrated implementation, the video game 200 may include another virtual character 204 that is likewise controlled by a group of users 214, 216, 218, and 220. These users may control the virtual character 204 in a manner similar to that described above with reference to the virtual character 202. And thus, they may form a team to collaboratively or competitively play the video game 200 with the other team of users.

It will be appreciated that in some implementations the video game is a cloud executed video game, whereas in other implementations the video game may be executed by a local client device associated with one of the users.

In some implementations, some of the above concepts can be combined. For example, control of a given character may be bifurcated into different portions of control. However, for each portion of control, there may be multiple users that are queued to take control of the given portion. The queued users may then assume control in turn in a round robin fashion, for example for a limited amount of time for each user. For example, a number of users may each take a turn at controlling a given action of a character, such as jumping or shooting, etc.

In some implementations, a plurality of users can simultaneously control a given input. For example, input data from the plurality of users can be aggregated and processed to determine the specific nature of the input. By way of example, in the case of control of a single button, button presses from the plurality of users may be aggregated to determine various aspects of the control, such as the timing of when the button is pushed, how long the button is held for, when the button is released, etc. In this manner, a given control input can be shared amongst many users. It will be appreciated that various methods can be employed to determine the consensus input based on the individual inputs of each of the plurality of users. For example, in some implementations, for a given unit of time in the video game, the most popular input is determined and applied (for example, based on majority of users' selection or by exceeding a threshold fraction of the users). It should be appreciated that the most popular input at a given moment in time may be defined by the absence of any action. In some implementations, and average or median of the inputs from the various users can be determined and applied as the consensus input.

It will be appreciated that the suitability of a particular method for determining the consensus input can depend upon the nature of that particular input. For example, in the case of a binary input type such as a button which has only on or off states, then it may be advantageous to determine which state is most popular at a given time as this result can be directly applied as the consensus input. Whereas, in the case of a joystick input that can include a broad range of directional and/or magnitude values, determining an average of the joystick inputs from the plurality of users may be useful and directly applicable.

While the above-described methods for determining a consensus input have been described with reference to a particular input device, for example of a controller device, in other implementations, similar concept can be applied for determining which inputs to apply for a single character or entity in the video game that is being collaboratively controlled by a group of users. That is, for a given character that is being controlled by a plurality of users simultaneously, each individual user provides input commands, for example through their respective controller devices and local computing devices. These input commands from the plurality of users are aggregated and processed to determine a single input stream (as if coming from a single controller) for the given character. For example, each user may operate a button of their respective controller that triggers a jump command In some implementations, when the number of users pressing the jump button within a particular time period exceeds a predefined threshold (e.g. fraction of total users exceeds a threshold amount, a majority presses the button, etc.), then the jump command is forwarded to the video game and executed by the character. As another example, each user may operate a joystick that controls movement of the character, and the aggregate joystick input is determined across all of the users, and utilized to determine the movement of the character. In some implementations, determining the aggregate joystick input includes determining an average or median of joystick input values such as directional and/or magnitude values.

In another implementation, users may each have an amount of virtual currency (e.g. in respective accounts) and are able to use the virtual currency to pay for the right to takeover control at a certain time in a game. In some implementations, the user that pays the most at a given time is given control of the character. In some implementations, the user that is currently playing may earn additional virtual currency based on their performance in the video game. It will be appreciated that virtual currency can be earned or bought through a variety of mechanisms apart from the video game as well, including through gameplay of other video games, promotions, direct purchase, etc.

In some implementations, users may vote on which particular user gets to control a given input or character/entity. In some implementations, there may be an online audience of spectators that can vote on which particular user gets to control a given input or character/entity.

Figure 3:
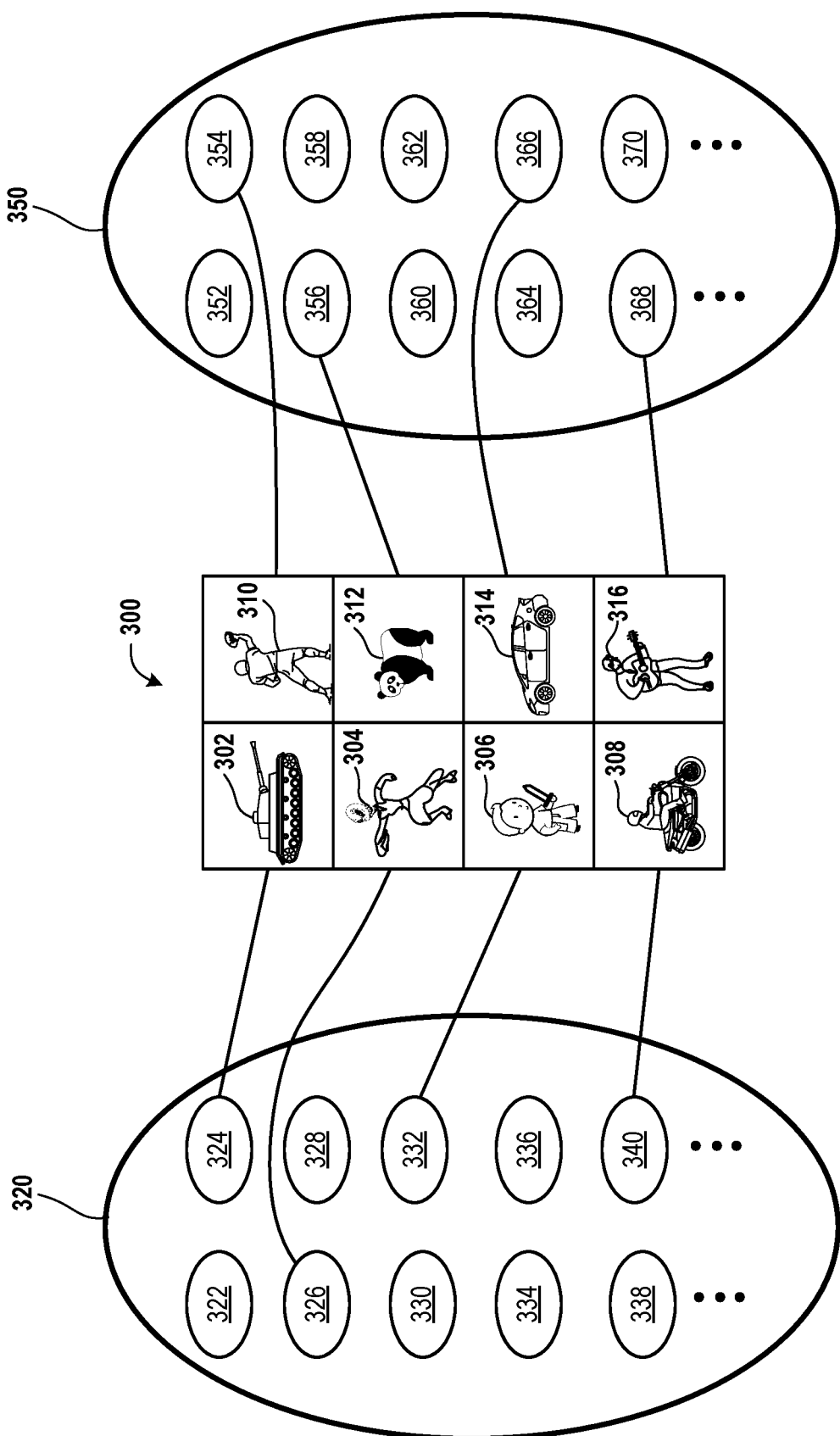
FIG. 3 conceptually illustrates teams of users controlling various virtual characters in a video game, in accordance with implementations of the disclosure.

FIG. 3 conceptually illustrates teams of users controlling various virtual characters in a video game, in accordance with implementations of the disclosure. In the illustrated implementation, a multiplayer video game 300 is configured to have teams of virtual characters or other virtual entities that compete against one another. For example a first team may consist of characters 302, 304, 306, and 308. Whereas another team may consist of characters 310, 312, 314, and 316. The teams of characters are controlled by respective teams of users. In the illustrated implementation, a first team of users 320 controls the various virtual characters of the first team of characters (characters 302, 304, 306, and 308). And a second team of users 350 controls the various virtual characters of the second team of characters (characters 310, 312, 314, and 316).

In accordance with implementations of the disclosure, there can be many more users on a team of users than there are available characters to control in their respective team of virtual characters in the video game. Thus by way of example, in the illustrated implementation, the first team of users 320 includes users 322, 324, 326, 328, 330, 332, 334, 336, 338, and 340. At any given time, a subset of the users of the first team 320 can be assigned to control the virtual characters of the first team of characters. For example, with reference to the illustrated implementation, the users 324, 326, 332, and 340 are shown at present to be respectively controlling the virtual characters 302, 304, 306, and 308.

In some implementations, one of the users on a team of users may be designated as a team captain, with the ability to select or determine which particular users are assigned to control particular virtual characters. For example, the user 322 may be a team captain of the team 320, and thus able to pick amongst the users of his or her team to determine which ones will control the various characters (302, 304, 306, and 308) of the first team of characters at any given point in time. In this manner, the team captain may strategically utilize the users of the team to effectively compete in the video game. This can add an additional layer of engagement in the game play of the video game.

In some implementations, the team captain has access to player information which can help inform the team captain's utilization of the available users on their team. For example, information may be displayed to the team captain such as player rankings, skill ratings, player gameplay statistics, player experience ratings, or other information that reflects an evaluation of the users' gameplay abilities for the video game. By considering such information, the team captain may understand the strengths and weaknesses of the users on their team, and accordingly choose which users to assign to which virtual characters and when the assign them based on this understanding. Furthermore, the real-time statistics of users during the active gameplay session can be tracked and displayed to the team captain.

In some implementations, a social network can be leveraged in such a team gaming scenario. For example, the system may enable the team captain to send an invite to a member of their social graph, for example, that possesses a certain skill or experience. By way of example without limitation, such an invite could be sent via the social network or through other communication channels such as an e-mail, text message, instant message, notification, etc.

In some implementations, data about player skill sets can be collected and analyzed by an online system and player profiles can be generated. For example, the system may be configured to automatically assign players using such information so as to balance out the skill sets of the teams to promote more even competition.

Likewise with reference to the illustrated implementation, the virtual characters of the second team of virtual characters are controlled by a team of users 350, including users 352, 354, 356, 358, 360, 362, 364, 366, 368, and 370. As shown, the virtual characters 310, 312, 314, and 316, are at present being respectively controlled by the users 354, 356, 366, and 364. Similar to the concept described above, the specific assignment of users to control virtual characters can be determined by a team captain, which in the illustrated implementation may be the user 352.

Further, while the team captains 322 and 352 may respectively control the assignment of their teams 320 and 350, it will be appreciated that this can be combined with other concepts described in the present disclosure. For example, there may be a time limit to how long a given user can control a given virtual character, thereby requiring the team captain to continually determine who will next assume control of a given character when the time limit expires. In some implementations, there may be a usage requirement or incentivization, such as requiring or incentivizing (e.g. via bonuses or penalties) the team captain to use all of the players of their team within a given time span, or to use players for a similar amount of time, etc. Such an implementation can help ensure that all the users of a given team are given a chance to participate in controlling a virtual character during the game play.

Furthermore, in some implementations, there can be automatic rebalancing of users based on skill levels. For example, if two teams are playing and one team is more skilled than the other (e.g. as determined from player gameplay metrics) or winning by a significant margin (e.g. winning multiple rounds and/or winning by an amount exceeding a threshold), then at the end of a round some of the more skilled users can be moved/traded to the other team. This can help to ensure more even distribution of skill amongst teams and provide fairer gameplay and thereby more engaging challenges in the gameplay.

In some implementations, one or more of the players or controls could be computer-controlled by the system (e.g. a bot). This can be another way to address imbalances in the skill levels of teams. For example, when there is a significant difference in the skill levels of teams competing against each other, the team having a lower skill level might have the option to use a computer-controlled bot (e.g. to control a virtual character or subset of commands) when facing another team having a higher skill level. Further, as teams progress and become more skilled, the ability to use such bots may be deactivated or turned off.

Figure 4A:
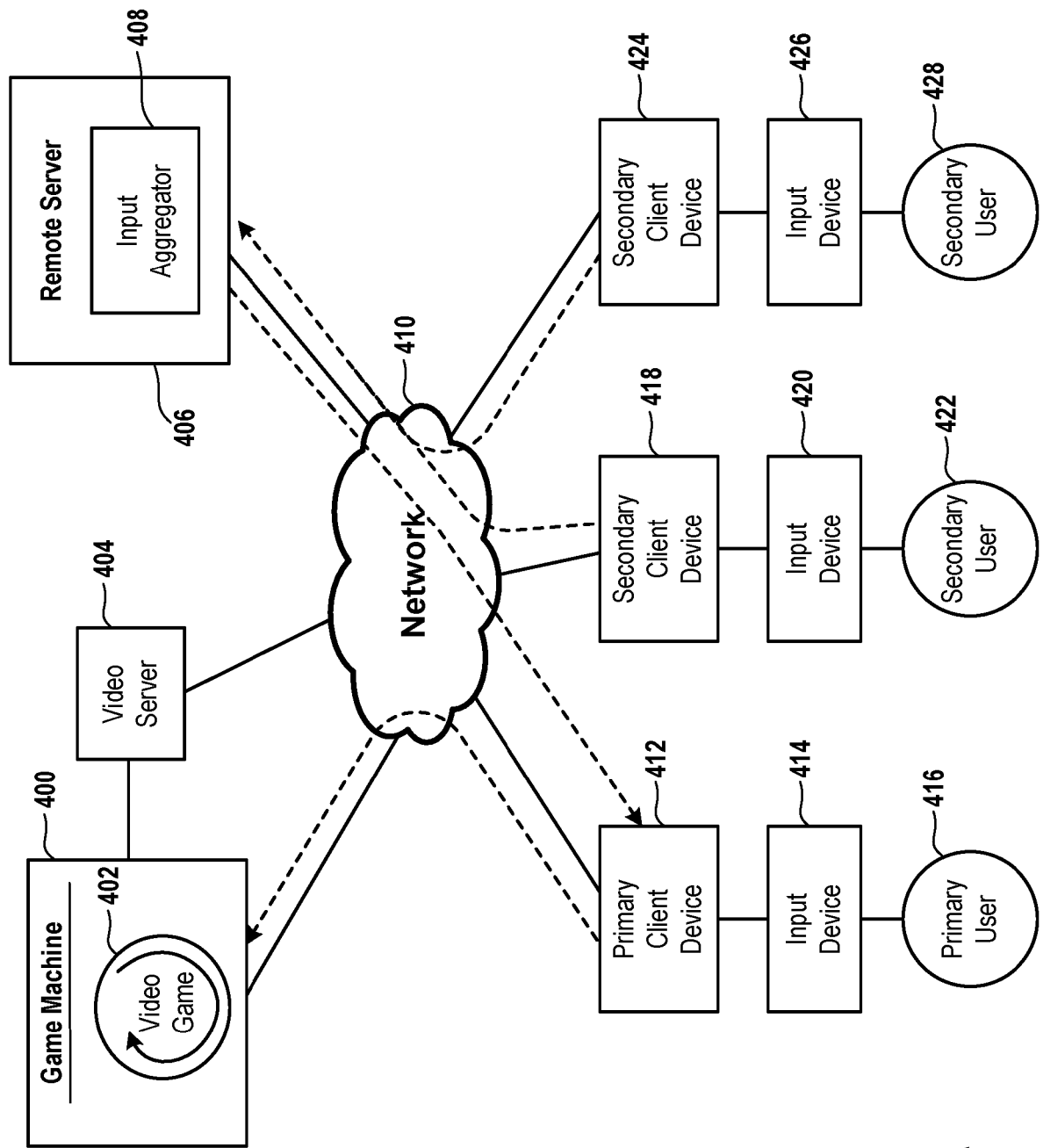
FIG. 4A illustrates a system for managing collaborative input to a video game, in accordance with implementations of the disclosure.

FIG. 4A illustrates a system for managing collaborative input to a video game, in accordance with implementations of the disclosure. In the illustrated implementation, a session 402 of cloud video game is executed by a cloud game machine 400. For ease of description in the present disclosure, the executing session 402 of the video game may also be referred to as simply the video game, which will be apparent to those skilled in the art. In some implementations, the game machine 400 is a game console or hardware equivalent of a game console, such as a unit of a blade server. One example of a game console is the Sony PlayStation 4 game console. In some implementations, the game machine 400 is a server computer that is configured to provide the appropriate execution environment for the video game session 402. For example, in some implementations such a server computer may execute a virtual machine that provides the execution environment for the video game session 402. The game machine 400 can be situated in a data center along with other game machines.

In the illustrated implementation, the video game session 402 is defined for a primary user 416. That is, the video game session 402 is generated to enable gameplay of the video game by the primary user 416. In some implementations, the video game can be one that the primary user 416 owns, or otherwise has access to, for example through the primary user's cloud gaming platform account. Broadly speaking, the video game session 402 is configured to generate, maintain, and update a game state of the video game that defines the status of variables of the video game. The video game session 402 receives a stream of input data over a network 410 from a primary client device 412, and processes the input data to update the game state. The video game session 402 utilizes the game state to render video of the video game, including both image data and audio data, that is passed back to the primary client device 412 over the network 410. In some implementations, the video generated by the executing video game session 402 is further processed by a video server 404, such as applying compression or other video streaming optimization technologies, wherein the video server then sends the video data over the network 410 to the primary client device 412. The primary client device 412 receives the video data and renders it to a display device, which may be separate from (e.g. television, monitor, head-mounted display or virtual reality headset, etc.) or incorporated into (e.g. laptop, tablet, smartphone, etc.) the primary client device 412.

As shown in the illustrated implementation, the primary user 416 operates an input device 414 that is operatively connected to the primary client device 412, to provide input for the video game. The input device 414 can be any kind of device suitable for providing user input for the video game, such as a controller device, motion controller, mouse, keyboard, image capture device or camera, (2D, 3D, stereo, infrared, etc.) microphone, etc. The data generated by the input device 414 in response to activity from the primary user 416 is processed by the primary client device 412 to define an input stream that is transmitted to the game machine 400 over the network 410 to be processed by the executing video game session 402.

In accordance with implementations of the disclosure, input from additional secondary users 422 and 428 is combined with that from the primary user 416 to enable the users to collectively supply the input stream to the video game. In order for the secondary users 422 and 428 to be able to participate in the session defined for the primary user 416 in this manner, the secondary users should be enabled to view the video generated by the video game session 402. Thus, in some implementations, the video data transmitted by the video server 404 is also transmitted over the network to secondary client devices 418 and 424 that are operated by the secondary users 422 and 428, respectively. While to secondary users and corresponding secondary client devices and input devices are shown, it will be appreciated that there can be any number of secondary users and corresponding client devices and input devices.

In some implementations, the video is shared from the primary client device 412 over the network 410 to the secondary client devices 418 and 424. In other words, the video stream received by the primary client device 412 can be re-transmitted over the network 410 to the secondary client devices. For example, the video can be transmitted using a real-time communications protocol such as WebRTC. Upon receipt of the video, the secondary client devices render the video to respective displays for viewing buy the secondary users. As noted above, such displays may be separate from or incorporated into the secondary client devices.

As shown, the secondary user 422 operates an input device 420 that is connected to the secondary client device 418. In response to interactivity with, or interactivity sensed by, the input device 420, the input device 420 transmits input data to the secondary client device 418. Similarly, the secondary user 428 operates an input device 426 that is connected to the secondary client device 424, and which transmits input data to the secondary client device 424. The secondary client devices each process their respective input data and transmit an input stream to the primary client device 412. In some implementations, the input stream from the secondary client devices is transmitted directly to the primary client device. That is, the secondary client device 418 transmits an input stream over the network 410 to the primary client device 412; and the secondary client device 424 transmits another input stream over the network 410 to the primary client device 412. It will be appreciated that each input stream transmitted from a secondary client device to the primary client device may consist of data that identifies specific interactive input from the secondary users, such as data identifying particular input device activation states (e.g. specific button presses, joystick movements, etc.), or commands resulting from such interactive input that are defined for the video game (e.g. commands to jump, fire, move, turn, etc.).

The primary client device 412 is configured to receive the input streams from the secondary client devices 418 and 424, and combine them with the interactive input from the primary user 416, to generate a single input stream that is transmitted over the network 410 to the game machine 400, to be processed by the executing video game session 402. In this way, the video game session 402 sees a single input stream, and little to no changes are required to be made to the video game in terms of input handling in order to facilitate multiple users collaboratively supplying input in this manner From the standpoint of the video game session 402, the single input stream that it receives is as if only the primary user 416 was playing the video game.

In accordance with the above-described architecture, any of the methods by which multiple users participate in gameplay as described herein can be implemented. For example, in a bifurcated control scenario, the primary user 416, the secondary user 422, and the secondary user 428, may each be assigned to control different aspects of a character in the video game. For purposes of illustration only, consider a scenario wherein the different aspects that are controllable and that are divided amongst the different users are running, jumping, and firing a weapon. Thus in such a scenario, the input data from the input device 414 would control the running of the character, whereas the input streams from the secondary client devices 418 and 424 would control the jumping and the firing of the weapon, respectively. The primary client device with us process the input data from the input device 414 along with the input streams from the secondary client devices to generate a single input stream that furnishes commands to the video game 402 so as to control all of these aspects of the character in the video game.

While the foregoing scenario has been described with reference to a bifurcated control scenario, it will be appreciated that the input streams and input data can be combined by the primary client device 412 in a variety of ways in accordance with implementations described in the present disclosure.

Furthermore, it will be appreciated that in the case where the video game is a multiplayer video game, there can be additional primary client devices and secondary client devices that may collectively control other characters in the video game.

In the above-described implementation, the input streams from the secondary client devices are transmitted directly to the primary client device 412. However, when there are too many secondary client devices connecting to the primary client device, an internet service provider might view this as suspicious and may take actions such as limiting the number of connections or block traffic from reaching the primary client device 412. For example a great number of secondary client devices connecting to the primary client device might be suspected as constituting a distributed denial-of-service attack. To avoid such problems, in some implementations, an input server 406 is provided to handle the connections from the secondary client devices. The input server 406 can be a socket server capable of providing multiple sockets to respectively handle the input streams from the secondary client devices. The server 406 can include input aggregator logic 408 that combines the input streams of the secondary client devices into a single input stream that is transmitted over the network 410 to the primary client device 412. In this manner, the primary client device 412 receives a single input stream that is a combination or aggregation of the input streams from the secondary client devices, rather than being required to handle multiple input streams from the various secondary client devices.

In another implementation, each of the various primary and secondary client devices is configured to send its respective input stream to the remote server 406, which is configured to aggregate the input streams and generate a single input stream for the video game. The remote server 406 then transmits the single input stream over the network 410 to the game machine 400 for processing by the executing video game session 402. In this manner, the remote server 406 handles the aggregation of the inputs for all of the client devices, for example using the input aggregator logic 408, and latency can be reduced as input streams do not need to be passed back to the primary client device before being transmitted to the game machine 400. In such an implementation, the game machine 400 is configured to output video as previously described, but is configured to receive the input stream from the remote server 406 instead of from the primary client device 412.

In yet another implementation, each of the input streams from the primary and secondary client devices is transmitted over the network 410 to the game machine 400 for processing by the video game session 402. In such an implementation, the video game session 400 to itself is configured to aggregate the various input streams and process them to facilitate the collaborative gameplay in accordance with methods described herein.

Figure 4B:
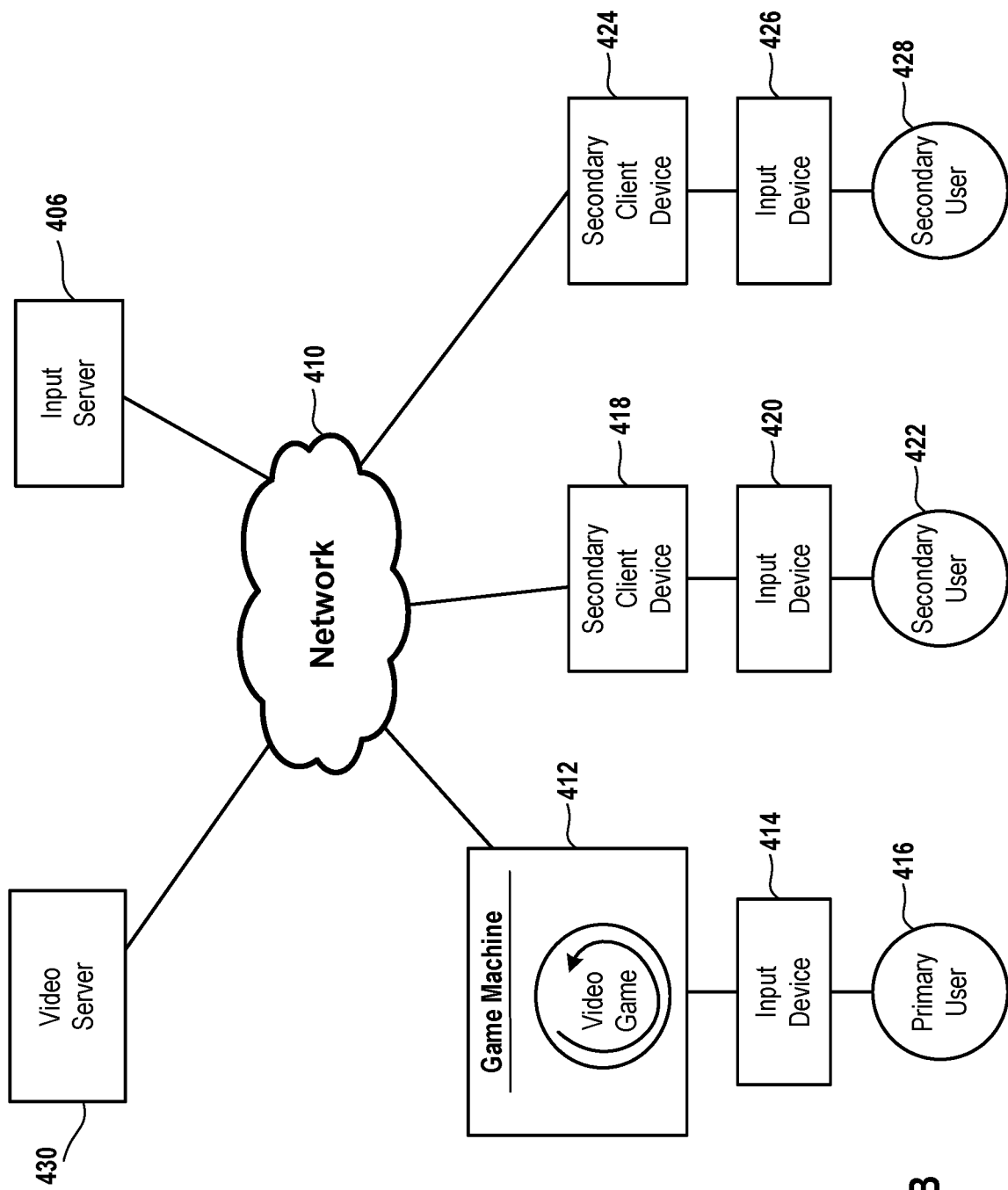
FIG. 4B illustrates a system for managing collaborative input to a video game, in accordance with implementations of the disclosure.

FIG. 4B illustrates a system for managing collaborative input to a video game, in accordance with implementations of the disclosure. In the illustrated implementation, the video game session is locally executed by the primary client device 412. In some implementations, the input streams from the secondary client devices are transmitted over the network 410 to the primary client device 412. Whereas in other implementations, the input streams from the secondary client devices are transmitted over the network 410 to the input server 406, the input server 406 being configured to aggregate the input streams into a single input stream that is transmitted to the primary client device 412.

In either case, the video game session 402 is configured to process the input streams from the secondary client devices in combination with the input data from the input device 414 to enable the various modes of collaborative gameplay in accordance with implementations described in the present disclosure.

As noted previously, the secondary client devices are provided with video of the video game so that the secondary users see substantially the same real-time view of the video game as the primary user 416. In some implementations, the video generated by the video game session is transmitted/streamed by the primary client device 412 over the network 410 to the secondary client devices. In some implementations, the video is transmitted over the network to a separate video server 430, which in turn handles the streaming of the video to the various secondary client devices.

With continued reference to the implementations of FIGS. 4A and 4B, in some implementations, the execution and handling of various portions of the processing can be dynamically allocated between local resources and cloud/remote server resources. For example, in some implementations, depending upon various factors/conditions, the streaming of the video of the executing video game session to the secondary client devices can be handled by the primary client device or can be offloaded to a remote video server. By way of example, such conditions may include the number of secondary client devices to which the video is to be streamed, the quality of the primary client device's network connection, the local resources of the primary client device (e.g. processor and memory resources), the load on the primary client device, etc. For example, if the number of secondary client devices becomes too high (e.g. exceeds a threshold number), or the quality of the video streaming falls below a threshold level, or latency exceeds a threshold amount, or streaming performance otherwise falls below an acceptable level, then the handling of the video streaming may be shifted from the primary client device to a remote video streaming server.

Further, in some implementations, the input aggregation may be handled by the primary client device or by a remote server, and dynamically switched based on existing conditions. It will be appreciated that such conditions may include any of the above-described conditions with respect to the handling of video streaming, but applied for purposes of determining whether and when to shift the handling of the input aggregation between the client device and the remote server. The handling of the video streaming and the handling of the input aggregation can thus be independently allocated between local and cloud resources, and either of these can be offloaded to separate servers distinct from the host client.

Additionally, it can be useful to distinguish between users that are only interested in watching or spectating versus users that are interested in participating and controlling. For example, when handling the video streaming there may be prioritization of players, who are actively participating in controlling some aspect of the video game, over spectators, who are not actively participating in such a manner. It will be appreciated that such prioritization may apply within a given group or queue or team of players as discussed in certain implementations herein, wherein those actively engaged in gameplay control are prioritized over those that are not actively engaged in gameplay control.

In some implementations, users may be prioritized based on proximity in a social network relative to the primary user.

Implementations of the present disclosure enable different users to control virtual characters/entities and/or subsets of the commands in a video game. Accordingly, there is an Issue of identifying which user is currently in control of a given virtual character/entity and/or a given command. Therefore, in some implementations, the system is configured to overlay graphics onto the gameplay video stream indicating which users are controlling which virtual characters or commands in the video game. In some implementations, individual users may be identified in such overlayed graphics by their screen names, user id's, avatars, etc. Furthermore, in some implementations, customizations and personalizations are possible for such overlays, such as animations (e.g. user's name in flames or surrounded by floating hearts, etc.), fonts, colors, etc.

In another implementation, the video game may provide an API to enable display of information identifying which users are controlling which characters or commands in the gameplay video stream. For example, the system may access the API to supply relevant information so that it may be rendered in the gameplay video stream. Using such a setup, the video game can integrate and render the identifying information in the context of the gameplay. For example, the identifying information can be rendered in a manner that follows a virtual character/entity in a three-dimensional manner in the virtual space of the video game.

In another implementation, the overlay or integration of graphics can be configured to display the inputs being supplied by specific users. For example, in a bifurcated control scenario as described herein, a graphic of a controller device can be displayed and further can be configured to graphically illustrate when users initiate various control inputs corresponding to the input devices of the controller device.

Figure 5:
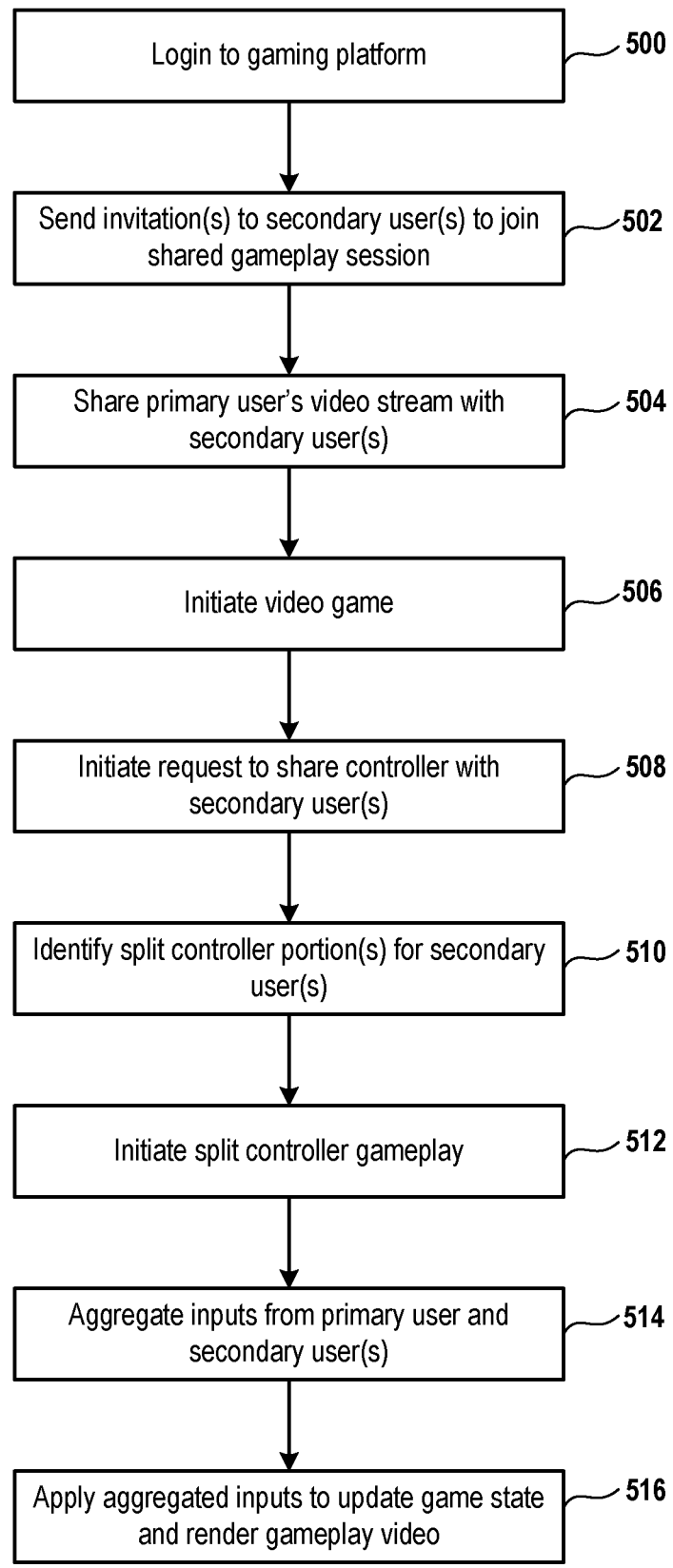
FIG. 5 illustrates a method for performing split controller gameplay of a video game, in accordance with implementations of the disclosure.

FIG. 5 illustrates a method for performing split controller gameplay of a video game, in accordance with implementations of the disclosure. At method operation 500, a primary user (host user) and one or more remote secondary users login to a gaming platform that enables communication between the users. For ease of description, the present method will be described with reference to a single secondary user; however, it will be appreciated that the present method may also apply to multiple secondary users. At method operation 502, the primary user sends an invitation to the secondary user to join a shared gameplay session. The invitation can appear to the secondary user as a notification, private message, etc. In some implementations, the gaming platform can be configured to access other communication channels, e.g. a separate social network, e-mail, text messaging service, etc., and send the invitation through such channels. It will be appreciated that in such implementations, the secondary user may not have logged in to the gaming platform prior to receiving the invitation, but instead will login after receiving the invitation.

At method operation 504, in response to the secondary user accepting the invitation, then the primary user's video stream is shared with the secondary user. It will be appreciated that the primary user's video stream can be shared in different ways depending upon the system setup. For example, in a cloud gaming implementation the cloud gaming system may provide a clone of the primary user's video stream to the secondary user's system (e.g. game console, computer, etc.). In a local gaming implementation the primary user's video stream can be shared from the primary user's system (e.g. game console, computer, etc.) over the network to the secondary user's system, optionally via a remote video server. By receiving the primary user's video stream, the secondary user will be able to see the same content that the primary user is viewing.

At method operation 506, the primary user initiates the execution of the video game. Again, in some implementations, the video game can be cloud executed by a cloud gaming system, or in some implementations, locally executed by the primary user's system. As the primary user video stream is being shared with the secondary user then the secondary user will also see the execution of the video game.

At method operation 508, the primary user initiates a request to share their controller with the secondary user, for example, by activating a controller sharing interface. In some implementations, the controller sharing interface provides options for sharing the controller, such as sharing the entire controller (handing control over to the secondary user) or sharing a portion of the controller. In the present instance, the primary user chooses to share a portion of their controller with the secondary user, so that the secondary user controls commands that are mapped to a portion of the input devices of the primary user's controller device. As part of the process, the request to share the controller may cause a notification to the secondary user informing the secondary user that the primary user wishes to share their controller, and requesting the secondary user to accept/agree to do so.

At method operation 512, optionally upon such acceptance by the secondary user, then the split controller gameplay is initiated. That is, a portion of the primary user's controller device is virtually controlled by the secondary user. In some implementations, during such split controller gameplay, the shared portion of the primary user's controller device is deactivated while it is being controlled by the secondary user.

At method operation 514, optionally as part of facilitating the split/bifurcated controller gameplay, the inputs from the primary user and the secondary user are aggregated before being transmitted to the executing video game. In other words, the portion of inputs corresponding to the portion of the primary user controller device that are controlled by the secondary user are merged with the inputs from the primary user to form a single input stream that is transmitted to the executing video game. In this manner, the video game receives inputs as if they were from a single controller device.

At method operation 516, the aggregated inputs are applied by the executing video game to update the game state of the video game and render gameplay video. The rendered gameplay video is continuously streamed to the primary user and the secondary user as previously described.

Figure 6:
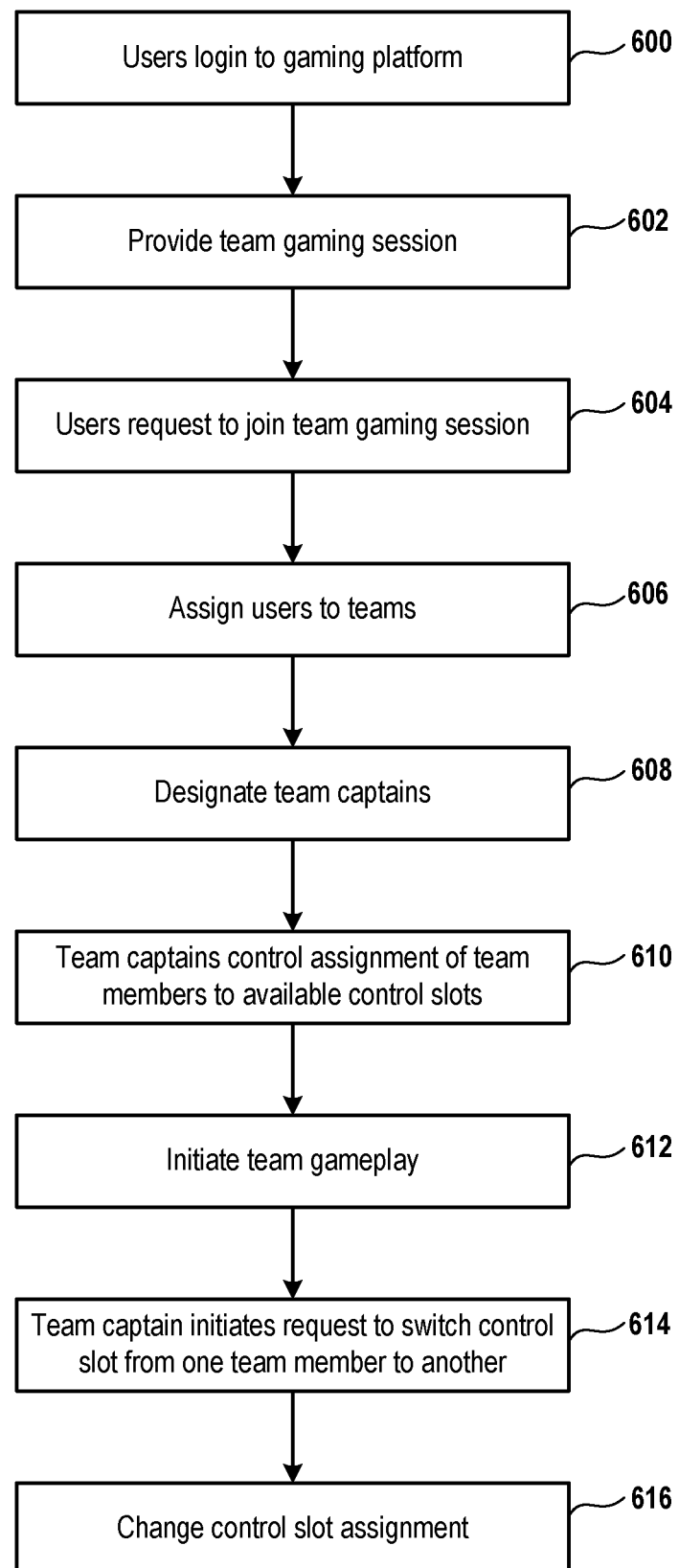
FIG. 6 illustrates a method for team video gaming, wherein team members may be substituted for each other to control a given virtual character/entity in the video game, in accordance with implementations of the disclosure.

FIG. 6 illustrates a method for team video gaming, wherein team members may be substituted for each other to control a given virtual character/entity in the video game, in accordance with implementations of the disclosure. At method operation 600, users login to a gaming platform that supports team video gaming. For example, in some implementations, the gaming platform is a cloud gaming platform that enables the users, who are remotely situated both from the cloud gaming platform and from each other, to access the cloud gaming platform over a network such as and/or including the Internet. The cloud gaming platform may provide for execution of the video game and streaming video to the users' client devices. At method operation 602, a team gaming session is provided. In some implementations, the availability of the team gaming session is displayed through the gaming platform, for example in a "lobby" area or other interface that provides access to the video gaming options of the cloud gaming platform.

At method operation 604, the users request to join the team gaming session, and are added to the team gaming session. In some implementations, the users respond to invitations to join the team gaming session. At method operation 606, the users are assigned to teams. In some implementations, the users may choose or indicate a preference for a particular team. In some implementations, the users are assigned by the system to specific teams, e.g. based on skill level or ability so as to provide balanced teams. At method operation 608, team captains are designated for each team. In some implementations, members of a given team vote to determine their team captain. In some implementations, the system assigns one member to be the team captain. In some implementations, team captain assignment can be rotated, either in response to user request or automatically (e.g. between rounds of gameplay).

At method operation 610, the team captains control the assignment of their team members to available control slots for controlling individual virtual characters or entities in the video game. That is, for each team of players, there is a limited number of available virtual characters to control. In other words, for each team of users, there is a "team" of virtual characters in the video game that they may control. The team captain for a given team can determine which specific user on their team will control a given virtual character.

After an initial assignment of users to virtual characters, at method operation 612 the team gameplay is initiated. At method operation 614, the team captain of a given team of users may initiate a request to switch control of a virtual character from a first team member to a second team member. At method operation 616, accordingly, the control of the virtual character is passed from the first to the second team member. In doing so, the inputs from the first team member no longer control the virtual character, whereas the inputs from the second team member now control the virtual character.

While the foregoing implementation has generally been described with reference to cloud gaming, in other implementations, the team video game may be locally executed by at least one of the users' local client devices.

Figure 7:
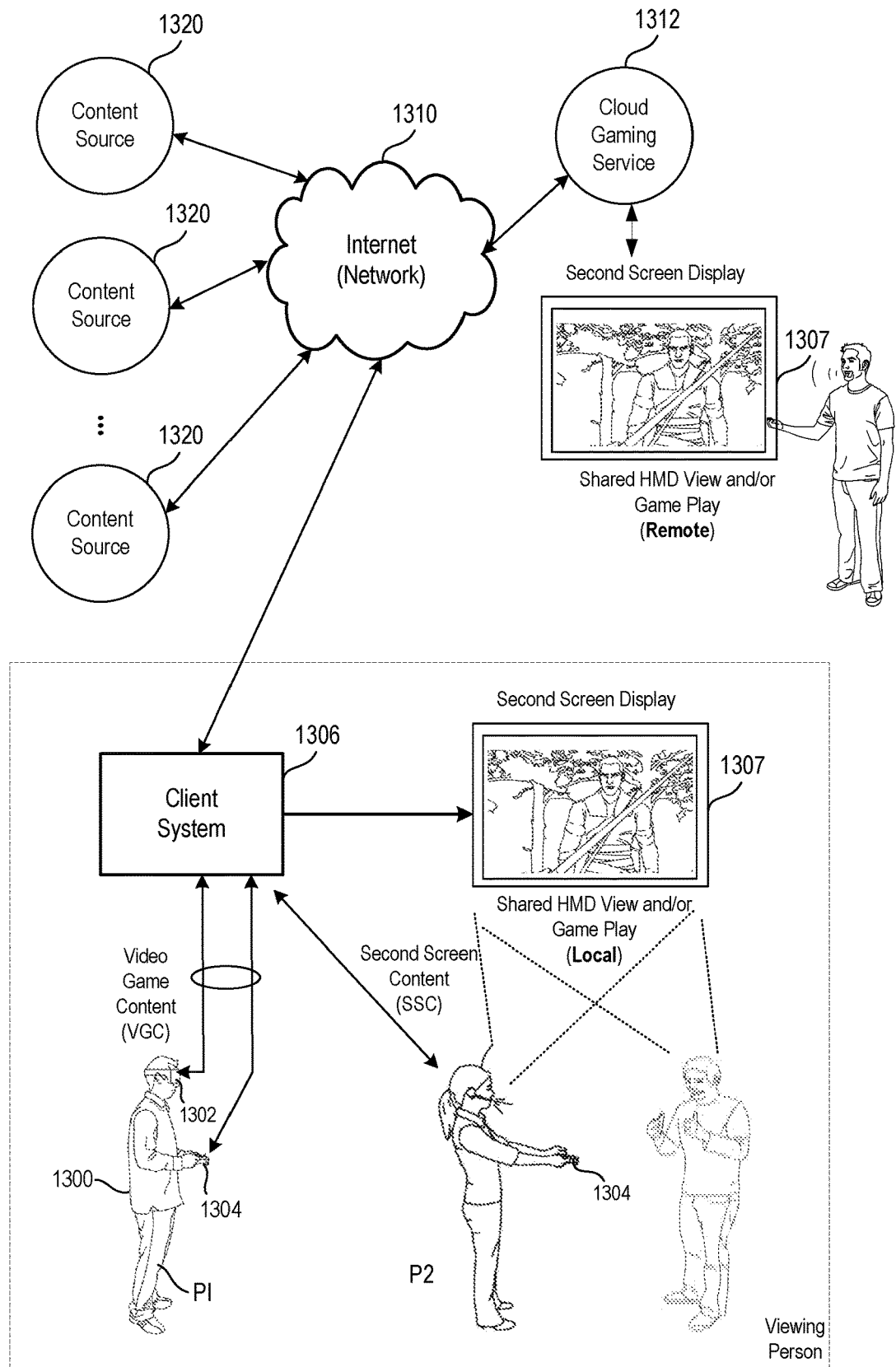
FIG. 7 illustrates one example of an HMD user interfacing with a client system, and the client system providing content to a second screen display, which is referred to as a second screen, in accordance with one implementation.

FIG. 7 illustrates one example of an HMD 1302 user 1300 interfacing with a client system 1306, and the client system 1306 providing content to a second screen display, which is referred to as a second screen 1307. It will be appreciated that instead of an HMD 1302, any other type of display device may be substituted, on which interactive content is capable of being rendered to the user 1300 (e.g. television, monitor, laptop display, mobile device display, etc.). The client system 1306 may include integrated electronics for processing the sharing of content from the HMD 1302 to the second screen 1307. Other implementations may include a separate device, module, connector, that will interface between the client system and each of the HMD 1302 and the second screen 1307. In this general example, user 1300 is wearing HMD 1302 and is playing a video game using a controller, which may also be interface object 1304. The interactive play by user 1300 will produce video game content (VGC), which is displayed interactively to the HMD 1302.

In one implementation, the content being displayed in the HMD 1302 is shared to the second screen 1307. In one example, a person viewing the second screen 1307 can view the content being played interactively in the HMD 1302 by user 1300. In another implementation, another user (e.g. player 2) can interact with the client system 1306 to produce second screen content (SSC). The second screen content produced by a player also interacting with the controller 1304 (or any type of user interface, gesture, voice, or input), may be produced as SSC to the client system 1306, which can be displayed on second screen 1307 along with the VGC received from the HMD 1302.

Accordingly, the interactivity by other users who may be co-located or remote from an HMD user can be social, interactive, and more immersive to both the user 1300 and users that may be viewing the content played by the user 1300 on a second screen 1307. As illustrated, the client system 1306 can be connected to the Internet 1310. The Internet can also provide access to the client system 1306 to content from various content sources 1320. The content sources 1320 can include any type of content that is accessible over the Internet.

Such content, without limitation, can include video content, movie content, streaming content, social media content, news content, friend content, advertisement content, etc. In one implementation, the client system 1306 can be used to simultaneously process content for an HMD user, such that the HMD is provided with multimedia content associated with the interactivity during gameplay. The client system 1306 can then also provide other content, which may be unrelated to the video game content to the second screen. The client system 1306 can, in one implementation receive the second screen content from one of the content sources 1320, or from a local user, or a remote user.

Figure 8:
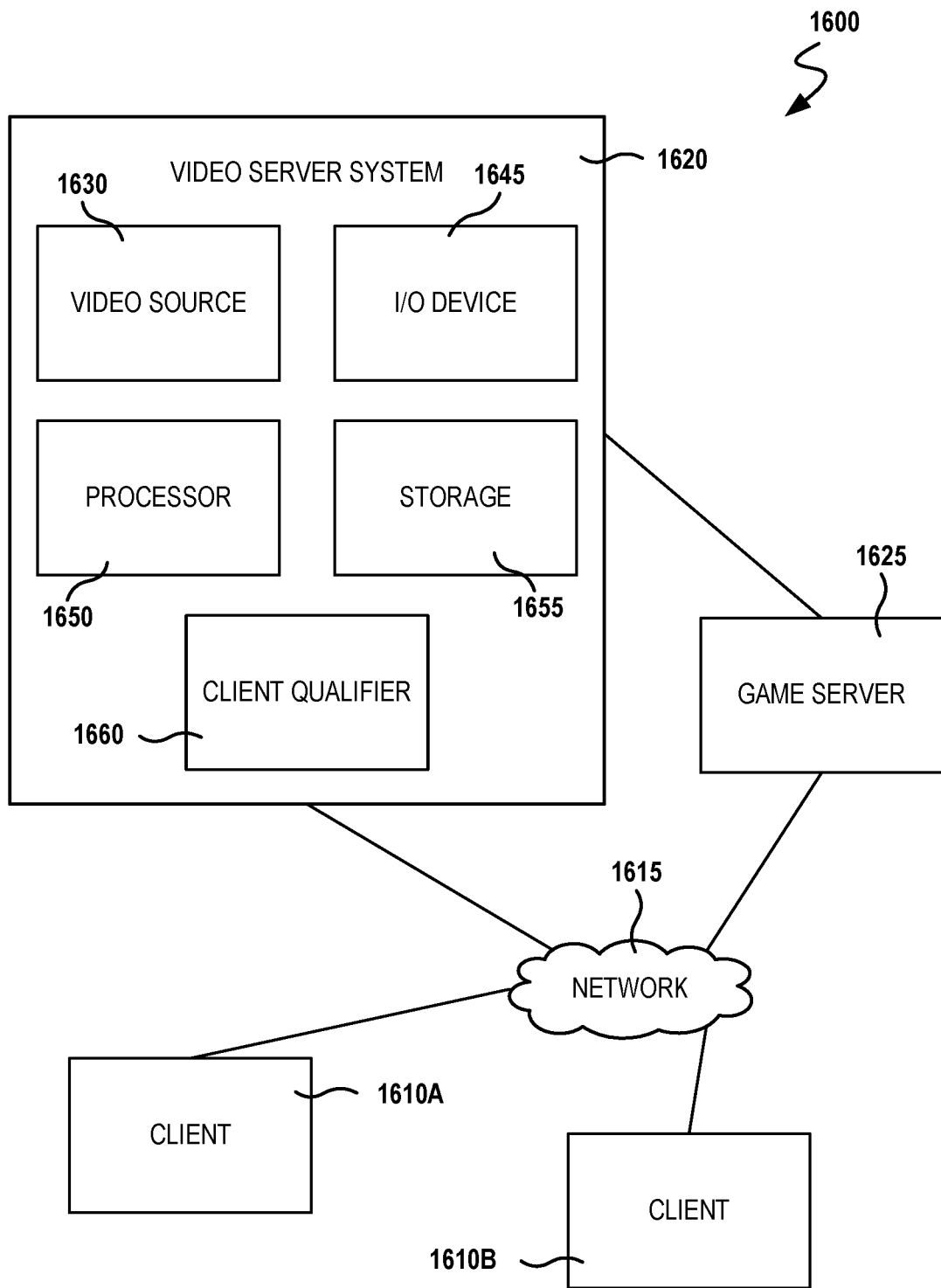
FIG. 8 is a block diagram of a Game System 1600, according to various implementations of the disclosure.

FIG. 8 is a block diagram of a Game System 1600, according to various implementations of the disclosure. Game System 1600 is configured to provide a video stream to one or more Clients 1610 via a Network 1615. Game System 1600 typically includes a Video Server System 1620 and an optional game server 1625. Video Server System 1620 is configured to provide the video stream to the one or more Clients 1610 with a minimal quality of service. For example, Video Server System 1620 may receive a game command that changes the state of or a point of view within a video game, and provide Clients 1610 with an updated video stream reflecting this change in state with minimal lag time. The Video Server System 1620 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1610, referred to herein individually as 1610A, 1610B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1610 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1610 or on a separate device such as a monitor or television. Clients 1610 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1610 are optionally geographically dispersed. The number of clients included in Game System 1600 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1620 to deliver a game viewed through the HMD. In one implementation, the game console receives the video stream from the video server system 1620, and the game console forwards the video stream, or updates to the video stream, to the HMD for rendering.

Clients 1610 are configured to receive video streams via Network 1615. Network 1615 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1610 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1610 may, but are not required to, further include systems configured for modifying received video. For example, a Client may be configured to perform further rendering, to overlay one video image on another video image, to crop a video image, and/or the like. For example, Clients 1610 may be configured to receive various types of video frames, such as I-frames, P-frames and B-frames, and to process these frames into images for display to a user. In some implementations, a member of Clients 1610 is configured to perform further rendering, shading, conversion to 3-D, or like operations on the video stream. A member of Clients 1610 is optionally configured to receive more than one audio or video stream. Input devices of Clients 1610 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1610 is generated and provided by Video Server System 1620. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1610 are typically configured to receive inputs from a user. These inputs may include game commands configured to change the state of the video game or otherwise affect game play. The game commands can be received using input devices and/or may be automatically generated by computing instructions executing on Clients 1610. The received game commands are communicated from Clients 1610 via Network 1615 to Video Server System 1620 and/or Game Server 1625. For example, in some implementations, the game commands are communicated to Game Server 1625 via Video Server System 1620. In some implementations, separate copies of the game commands are communicated from Clients 1610 to Game Server 1625 and Video Server System 1620. The communication of game commands is optionally dependent on the identity of the command Game commands are optionally communicated from Client 1610A through a different route or communication channel that that used to provide audio or video streams to Client 1610A.

Game Server 1625 is optionally operated by a different entity than Video Server System 1620. For example, Game Server 1625 may be operated by the publisher of a multiplayer game. In this example, Video Server System 1620 is optionally viewed as a client by Game Server 1625 and optionally configured to appear from the point of view of Game Server 1625 to be a prior art client executing a prior art game engine. Communication between Video Server System 1620 and Game Server 1625 optionally occurs via Network 1615. As such, Game Server 1625 can be a prior art multiplayer game server that sends game state information to multiple clients, one of which is game server system 1620. Video Server System 1620 may be configured to communicate with multiple instances of Game Server 1625 at the same time. For example, Video Server System 1620 can be configured to provide a plurality of different video games to different users. Each of these different video games may be supported by a different Game Server 1625 and/or published by different entities. In some implementations, several geographically distributed instances of Video Server System 1620 are configured to provide game video to a plurality of different users. Each of these instances of Video Server System 1620 may be in communication with the same instance of Game Server 1625. Communication between Video Server System 1620 and one or more Game Server 1625 optionally occurs via a dedicated communication channel. For example, Video Server System 1620 may be connected to Game Server 1625 via a high bandwidth channel that is dedicated to communication between these two systems.

Video Server System 1620 comprises at least a Video Source 1630, an I/O Device 1645, a Processor 1650, and non-transitory Storage 1655. Video Server System 1620 may include one computing device or be distributed among a plurality of computing devices. These computing devices are optionally connected via a communications system such as a local area network.

Video Source 1630 is configured to provide a video stream, e.g., streaming video or a series of video frames that form a moving picture. In some implementations, Video Source 1630 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1625. Game Server 1625 may maintain a copy of the state of the game based on game commands received from multiple players using geographically disperse clients. In these cases, the game state is provided by Game Server 1625 to Video Source 1630, wherein a copy of the game state is stored and rendering is performed. Game Server 1625 may receive game commands directly from Clients 1610 via Network 1615, and/or may receive game commands via Video Server System 1620.

Video Source 1630 typically includes rendering logic, e.g., hardware, firmware, and/or software stored on a computer readable medium such as Storage 1655. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1610. For example, the raw video (which may include audio) may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp4, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1630 includes a video recording device such as a camera. This camera may be used to generate delayed or live video that can be included in the video stream of a computer game. The resulting video stream optionally includes both rendered images and images recorded using a still or video camera. Video Source 1630 may also include storage devices configured to store previously recorded video to be included in a video stream. Video Source 1630 may also include motion or positioning sensing devices configured to detect motion or position of an object, e.g., person, and logic configured to determine a game state or produce video-based on the detected motion and/or position.

Video Source 1630 is optionally configured to provide overlays configured to be placed on other video. For example, these overlays may include a command interface, log in instructions, messages to a game player, images of other game players, video feeds of other game players (e.g., webcam video). In implementations of Client 1610A including a touch screen interface or a gaze detection interface, the overlay may include a virtual keyboard, joystick, touch pad, and/or the like. In one example of an overlay a player's voice is overlaid on an audio stream. Video Source 1630 optionally further includes one or more audio sources.

In implementations wherein Video Server System 1620 is configured to maintain the game state based on input from more than one player, each player may have a different point of view comprising a position and direction of view. Video Source 1630 is optionally configured to provide a separate video stream for each player based on their point of view. Further, Video Source 1630 may be configured to provide a different frame size, frame data size, and/or encoding to each of Client 1610. Video Source 1630 is optionally configured to provide 3-D video.

I/O Device 1645 is configured for Video Server System 1620 to send and/or receive information such as video, commands, requests for information, a game state, gaze information, device motion, device location, user motion, client identities, player identities, game commands, security information, audio, and/or the like. I/O Device 1645 typically includes communication hardware such as a network card or modem. I/O Device 1645 is configured to communicate with Game Server 1625, Network 1615, and/or Clients 1610.

Processor 1650 is configured to execute logic, e.g. software, included within the various components of Video Server System 1620 discussed herein. For example, Processor 1650 may be programmed with software instructions in order to perform the functions of Video Source 1630, Game Server 1625, and/or a Client Qualifier 1660. Video Server System 1620 optionally includes more than one instance of Processor 1650. Processor 1650 may also be programmed with software instructions in order to execute commands received by Video Server System 1620, or to coordinate the operation of the various elements of Game System 1600 discussed herein. Processor 1650 may include one or more hardware device. Processor 1650 is an electronic processor.

Storage 1655 includes non-transitory analog and/or digital storage devices. For example, Storage 1655 may include an analog storage device configured to store video frames. Storage 1655 may include a computer readable digital storage, e.g. a hard drive, an optical drive, or solid state storage. Storage 1615 is configured (e.g. by way of an appropriate data structure or file system) to store video frames, artificial frames, a video stream including both video frames and artificial frames, audio frame, an audio stream, and/or the like. Storage 1655 is optionally distributed among a plurality of devices. In some implementations, Storage 1655 is configured to store the software components of Video Source 1630 discussed elsewhere herein. These components may be stored in a format ready to be provisioned when needed.

Video Server System 1620 optionally further comprises Client Qualifier 1660. Client Qualifier 1660 is configured for remotely determining the capabilities of a client, such as Clients 1610A or 1610B. These capabilities can include both the capabilities of Client 1610A itself as well as the capabilities of one or more communication channels between Client 1610A and Video Server System 1620. For example, Client Qualifier 1660 may be configured to test a communication channel through Network 1615.

Client Qualifier 1660 can determine (e.g., discover) the capabilities of Client 1610A manually or automatically. Manual determination includes communicating with a user of Client 1610A and asking the user to provide capabilities. For example, in some implementations, Client Qualifier 1660 is configured to display images, text, and/or the like within a browser of Client 1610A. In one implementation, Client 1610A is an HMD that includes a browser. In another implementation, client 1610A is a game console having a browser, which may be displayed on the HMD. The displayed objects request that the user enter information such as operating system, processor, video decoder type, type of network connection, display resolution, etc. of Client 1610A. The information entered by the user is communicated back to Client Qualifier 1660.

Automatic determination may occur, for example, by execution of an agent on Client 1610A and/or by sending test video to Client 1610A. The agent may comprise computing instructions, such as java script, embedded in a web page or installed as an add-on. The agent is optionally provided by Client Qualifier 1660. In various implementations, the agent can find out processing power of Client 1610A, decoding and display capabilities of Client 1610A, lag time reliability and bandwidth of communication channels between Client 1610A and Video Server System 1620, a display type of Client 1610A, firewalls present on Client 1610A, hardware of Client 1610A, software executing on Client 1610A, registry entries within Client 1610A, and/or the like.

Client Qualifier 1660 includes hardware, firmware, and/or software stored on a computer readable medium. Client Qualifier 1660 is optionally disposed on a computing device separate from one or more other elements of Video Server System 1620. For example, in some implementations, Client Qualifier 1660 is configured to determine the characteristics of communication channels between Clients 1610 and more than one instance of Video Server System 1620. In these implementations the information discovered by Client Qualifier can be used to determine which instance of Video Server System 1620 is best suited for delivery of streaming video to one of Clients 1610.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method, comprising:
   executing a video game by a cloud gaming machine, wherein executing the video game instantiates a team gaming session for a plurality of client devices;
   assigning each of the plurality of client devices to one of a plurality of teams;
   streaming, by a video server over a network, video generated from the executing video game to the plurality of client devices;
   enabling gameplay of the video game, wherein the gameplay is defined between the plurality of teams as participants in the team gaming session, such that gameplay by each given team includes control of a plurality of virtual objects associated to the given team, wherein one of the client devices of the given team is associated to a team captain, and, for each one of the plurality of virtual objects associated to the given team, control is separately assigned and reassigned by the team captain to enable control by at least two of the client devices of the given team, respectively.

2. The method of claim 1, wherein a predefined condition for reassignment of control by the team captain includes determining that a predefined period of time has elapsed.

3. The method of claim 1, wherein a predefined condition for reassignment of control by the team captain includes detecting one or more gameplay events occurring during the gameplay of the video game.

4. The method of claim 1, wherein a predefined condition for reassignment of control by the team captain includes detecting an input from a given one of the client devices that currently controls the virtual object.

5. The method of claim 1, wherein a predefined condition for reassignment of control by the team captain includes detecting an input from a given one of the client devices that currently does not control the virtual object.

6. The method of claim 1, wherein reassignment of control of a virtual object from a first one of the client devices to a second one of the client devices includes transitioning, from applying inputs received from the first one of the client devices to control the virtual object, to applying inputs received from the second one of the client devices to control the virtual object.

7. The method of claim 6, wherein the inputs received from the first and second ones of the client devices are generated from first and second controller devices operatively connected to the first and second ones of the client devices, respectively.

8. The method of claim 1, wherein at least one of the virtual objects is a virtual character.

9. The method of claim 1, wherein the control of a virtual object is defined by a portion of control of the virtual object.

10. The method of claim 1, wherein control of at least one of the plurality of virtual objects is not initially assigned to the team captain.

11. The method of claim 1, wherein the gameplay by each given team includes a usage requirement or usage incentivization for each of the client devices of the given team.

12. A non-transitory computer readable medium having program instructions embodied thereon that, when executed by at least one computing device, cause said at least one computing device to perform a method comprising the following operations:
    executing a video game by a cloud gaming machine, wherein executing the video game instantiates a team gaming session for a plurality of client devices;
    assigning each of the plurality of client devices to one of a plurality of teams;
    streaming, by a video server over a network, video generated from the executing video game to the plurality of client devices;
    enabling gameplay of the video game, wherein the gameplay is defined between the plurality of teams as participants in the team gaming session, such that gameplay by each given team includes control of a plurality of virtual objects associated to the given team, wherein one of the client devices of the given team is associated to a team captain, and, for each one of the plurality of virtual objects associated to the given team, control is separately assigned and reassigned by the team captain to enable control by at least two of the client devices of the given team, respectively.

13. The non-transitory computer readable medium of claim 12, wherein a predefined condition for reassignment of control by the team captain includes determining that a predefined period of time has elapsed.

14. The non-transitory computer readable medium of claim 12, wherein a predefined condition for reassignment of control by the team captain includes detecting one or more gameplay events occurring during the gameplay of the video game.

15. The non-transitory computer readable medium of claim 12, wherein a predefined condition for reassignment of control by the team captain includes detecting an input from a given one of the client devices that currently controls the virtual object.

16. The non-transitory computer readable medium of claim 12, wherein a predefined condition for reassignment of control by the team captain includes detecting an input from a given one of the client devices that currently does not control the virtual object.

17. The non-transitory computer readable medium of claim 12, wherein reassignment of control of a virtual object from a first one of the client devices to a second one of the client devices includes transitioning, from applying inputs received from the first one of the client devices to control the virtual object, to applying inputs received from the second one of the client devices to control the virtual object.

18. The non-transitory computer readable medium of claim 17, wherein the inputs received from the first and second ones of the client devices are generated from first and second controller devices operatively connected to the first and second ones of the client devices, respectively.

19. The non-transitory computer readable medium of claim 12, wherein at least one of the virtual objects is a virtual character.

20. A system comprising at least one server computer, said at least one server computer configured to perform a method comprising the following operations:
- executing a video game by a cloud gaming machine, wherein executing the video game instantiates a team gaming session for a plurality of client devices;
- assigning each of the plurality of client devices to one of a plurality of teams;
- streaming, by a video server over a network, video generated from the executing video game to the plurality of client devices;
- enabling gameplay of the video game, wherein the gameplay is defined between the plurality of teams as participants in the team gaming session, such that gameplay by each given team includes control of a plurality of virtual objects associated to the given team, wherein one of the client devices of the given team is associated to a team captain, and, for each one of the plurality of virtual objects associated to the given team, control is separately assigned and reassigned by the team captain to enable control by at least two of the client devices of the given team, respectively.

21. The system of claim 20, wherein a predefined condition for reassignment of control by the team captain includes determining that a predefined period of time has elapsed.

* * * * *